United States Patent
Turtinen et al.

(10) Patent No.: US 11,496,979 B2
(45) Date of Patent: Nov. 8, 2022

(54) UPLINK TIMING ADJUSTMENT WITH MULTIPLE NUMEROLOGIES

(71) Applicant: NOKIA TECHNOLOGIES OY, Espoo (FI)

(72) Inventors: Samuli Heikki Turtinen, Ii (FI); Kari Juhani Hooli, Oulu (FI); Esa Tapani Tiirola, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/645,155

(22) PCT Filed: Jul. 9, 2018

(86) PCT No.: PCT/EP2018/068468
§ 371 (c)(1),
(2) Date: Mar. 6, 2020

(87) PCT Pub. No.: WO2019/048108
PCT Pub. Date: Mar. 14, 2019

(65) Prior Publication Data
US 2021/0168749 A1     Jun. 3, 2021

Related U.S. Application Data

(60) Provisional application No. 62/556,885, filed on Sep. 11, 2017.

(51) Int. Cl.
*H04W 56/00* (2009.01)
*H04W 76/27* (2018.01)
(Continued)

(52) U.S. Cl.
CPC ... *H04W 56/0045* (2013.01); *H04L 27/26025* (2021.01); *H04W 56/001* (2013.01); *H04W 76/27* (2018.02); *H04W 80/02* (2013.01)

(58) Field of Classification Search
CPC . H04W 56/0045; H04W 76/27; H04W 80/02; H04W 56/001; H04W 56/005; H04W 56/004; H04L 27/26025
See application file for complete search history.

(56) References Cited

U.S. PATENT DOCUMENTS

2017/0111908 A1* 4/2017 Xiong ............... H04W 56/0045
2017/0164350 A1* 6/2017 Sun ....................... H04L 5/0007
(Continued)

FOREIGN PATENT DOCUMENTS

| CN | 103493573 A | 1/2014 |
|---|---|---|
| CN | 107113145 A | 8/2017 |
| CN | 113015237 A | 6/2021 |

OTHER PUBLICATIONS

International Search Report and Written Opinion dated Oct. 16, 2018 corresponding to International Patent Application No. PCT/EP2018/068468.

(Continued)

*Primary Examiner* — Afshawn M Towfighi
(74) *Attorney, Agent, or Firm* — Alston & Bird LLP

(57) ABSTRACT

Various communication systems may benefit from improved signaling. For example, it may be helpful to improve the management of the uplink timing alignment where multiple numerologies are used. A method may include receiving at a user equipment an indication from a network node. The timing adjustment granularity may be determined implicitly based on one or more multiple numerology assigned to a timing advance group. The method may also include applying at the user equipment the indicated timing adjustment granularity associated with one of the multiple numerologies.

20 Claims, 3 Drawing Sheets

| SCS [kHz] | TA command granularity | |
|---|---|---|
| | number of time samples $T_s$ | time [ns] |
| 15 | 1024 | 520.8 |
| 30 | 512 | 260.4 |
| 60 | 256 | 130.2 |
| 120 | 128 | 65.1 |
| 240 | 64 | 32.6 |

(51) Int. Cl.
*H04L 27/26* (2006.01)
*H04W 80/02* (2009.01)

(56) References Cited

U.S. PATENT DOCUMENTS

2018/0352527 A1* 12/2018 Wang .................... H04L 5/0053
2019/0082408 A1* 3/2019 Kim .................. H04W 72/0453
2021/0235406 A1 7/2021 Llu et al.

OTHER PUBLICATIONS

Samsung, "On UL Transmission Timing Aspects," 3GPP Draft; R1-1714571, 3GPP TSG RAN WG1 Meeting #90, Prague, Czechia, Aug. 21-25, 2017, Aug. 20, 2017, XP051317341.
Huawei et al.: "On NR carrier aggregation," 3GPP Draft; R1-1712160, 3GPP TSG RAN WG1 Meeting #90, Prague, Czech Republic, Aug. 21-25, 2017, Aug. 20, 2017, XP051314979.
Huawei et al.: "Way Forward on NR Carrier Aggregation," R1-1715305, 3GPP TSG RAN WG1 Meeting #90, Prague, Czech Republic, Aug. 21-25, 2017, Agenda item: 6.1.3.4.
3GPP TS 36.321 V14.3.0 (Jun. 2017), Technical Specification, 3rd Generation Partnership Project; Technical Specification Group Radio Access Network; Evolved Universal Terrestrial Radio Access (E-UTRA); Medium Access Control (MAC) protocol specification (Release 14), Jun. 2017.
Metis II, Mobile and wireless communications Enablers for the Twenty-twenty Information Society—II, Deliverable D4.2 Final air interface harmonization and user plane design, Version V1.0, Apr. 30, 2017, 5GPPP, http://www.5g-ppp.eu/.
First Examination Report dated May 4, 2021 corresponding to Indian Patent Application No. 202047015256 with English translation.
Office Action issued in corresponding Indonesian Patent Application No. P00202001879 dated Jul. 23, 2021, with English translation thereof.
Notice of Preliminary Rejection issued in corresponding Korean Patent Application No. 2020-7010366 dated Jul. 13, 2021, with English summary therof.
First Office Action issued in correspondence Chinese Patent Application No. 201880058683.2 dated Dec. 14, 2021, with English summary thereof.
Samsung, "Initial access procedure for multiple numerologies in NR", 3GPP TSG-RAN WG2 NR #97 Meeting, R2-1701471, Feb. 13, 2017.
Office Action for Korean Application No. 10-2020-7010366 dated Dec. 22, 2021, 5 pages.
Notice of Allowance for Korean Application No. 10-2020-7010366 dated Apr. 1, 2022, 4 pages.
LG Electronics, "Support of DL/UL Control/Signal Transmission for NR CA", 3GPP TSG RAN WG1 Meeting #90, R1-1713203, (Aug. 21-25, 2017), 8 pages.
Office Action for European Application No. 18739511.6 dated Jul. 22, 2022, 7 pages.
Office Action for Chinese Application No. 201880058683.2 dated Aug. 3, 2022, 11 pages.
Huawci, "Introduction of NB-IoT", 3GPP TSG RAN1 Meeting #85, R1-165600, Draft Change Request 36.300 v13.3.0, (May 23-27, 2016), 18 pages.

* cited by examiner

Figure 1

| SCS [kHz] | TA command granularity | |
|---|---|---|
| | number of time samples $T_s$ | time [ns] |
| 15 | 1024 | 520.8 |
| 30 | 512 | 260.4 |
| 60 | 256 | 130.2 |
| 120 | 128 | 65.1 |
| 240 | 64 | 32.6 |

UPLINK TIMING ADJUSTMENT WITH MULTIPLE NUMEROLOGIES

CROSS REFERENCE TO RELATED APPLICATION

This application claims benefit or priority to U.S. Provisional Patent Application No. 62/556,885 filed on Sep. 11, 2017. The entire content of the above-referenced application is hereby incorporated by reference.

BACKGROUND

Field

Various communication systems may benefit from improved signaling. For example, it may be helpful to improve the management of the uplink timing adjustment or alignment where multiple numerologies are used.

Description of the Related Art

Timing adjustment or timing advance is a negative time offset applied at the user equipment between the start of a received downlink subframe and a transmitted uplink subframe, frame, or slot. The negative time offset at the user equipment is used to ensure that the downlink subframe and uplink subframe are synchronized at the network node. The goal of the timing adjustment is to synchronize receiver timing of uplink transmissions of different user equipment in a cell to be within a given cyclic prefix (CP) accuracy. This will ensure intra-cell orthogonality for UEs received by means of frequency domain equalizer at gNB.

Third generation partnership project (3GPP) technology, such as fifth generation (5G) and New Radio (NR) technology, is being developed in order to achieve a single technical framework addressing all usage scenario, requirements, and deployment. In 3GPP NR and Long Term Evolution (LTE) technology, the user equipment may be configured with multiple uplink carriers as part of carrier aggregation. The network may receive the uplink carriers with the same antennas or multiple antennas located in same location. In such cases, the uplink carries may share same uplink timing and hence they may be grouped within a same Timing Advance Group. In other cases, the network may receive the uplink carriers with antennas located in different locations. In such cases, the uplink carriers may use different uplink timing, due to different propagation distances and delays on the carriers, for example. The carriers are grouped into different Timing Advance Groups (TAGs) to manage the maintenance of multiple uplink timings. The maximum number of TAGs both in LTE and NR may be limited to 4. In NR, multiple numerology options related to multiple subcarrier spacing are supported. The subcarrier spacing may be, for example, 15, 30, 60, 120, and 240 kilohertz (kHz).

Granularity of the timing adjustment command in NR, associated with a SCS of 15 kHz, has the same granularity used in LTE technology. This means that a timing adjustment command granularity of 0.52 microseconds (μs) or 1024 time samples ($T_s$) is used in NR technology, with $T_s=1/(\Delta f_{max} \cdot N_f)$, $\Delta f_{max}=480 \cdot 10^3$ Hertz (Hz) and $N_f=4096$. This timing adjustment command presents sufficient accuracy for 15 kHz SCS with 4.7 μs normal CP.

Even within the same component carrier, NR technology allows for different bandwidth parts (BWP), with each BWP being connected to a specific numerology. A user equipment can be configured with multiple BWPs. The TAG, however, was designed to group multiple cells in LTE that share the same timing adjustment and reference point. For each TAG, the timing adjustment of a serving cell is used as the timing reference for the whole group, meaning that the same timing adjustment granularity is assumed for all of the BWPs in the serving cell belonging to the same TAG.

SUMMARY

According to certain embodiments, an apparatus may include at least one memory including computer program code, and at least one processor. The at least one memory and the computer program code may be configured, with the at least one processor, to cause the apparatus at least to receive an indication from a network node. A timing adjustment granularity may be determined implicitly based on the indication and one or more multiple numerology assigned to a timing advance group. The at least one memory and the computer program code may also be configured, with the at least one processor, to cause the apparatus at least to apply the indicated timing adjustment granularity associated with one of the multiple numerologies.

According to certain embodiments, a method may include receiving at a user equipment an indication from a network node. A timing adjustment granularity may be determined implicitly based on the indication and one or more multiple numerology assigned to a timing advance group. The method may also include applying at the user equipment the indicated timing adjustment granularity associated with one of the multiple numerologies.

In a variant, the method may additionally include transmitting an uplink transmission from the user equipment to the network node based on the indicated timing adjustment granularity.

In another variant, the timing adjustment granularity may be in relation to timing adjustment command.

In a variant, the timing adjustment granularity may be determined implicitly based on one of the multiple numerology assigned to a timing advance group.

In another variant, the indication may be a timing advance command or may indicate which granularity to apply by the timing advance command.

In an additional variant, the multiple numerologies may be included within a same timing advance group.

In yet another variant, the indication may include at least one of logical channel identification representing the timing adjustment granularity, a length of a timing advance command medium access control control element, field in the timing advance command medium access control control element, or a bit indicator in the MAC subheader.

In a further variant, the method may include deriving a default timing adjustment granularity based on one of the multiple numerologies used in a received synchronization signal block. The method may also include applying the default timing adjustment granularity before receiving the indication.

In an additional variant, the indication may be included as part of radio resource control signalling.

In a variant, the timing adjustment granularity may be semi-statically configured via the radio resource control signalling.

In a further variant, the timing adjustment granularity may be dynamically configured via the timing advance command medium access control control element.

In another variant, the timing adjustment granularity of at least two of the multiple granularities may be configured using the radio resource control signalling.

In an additional variant, the user equipment may receive at least one other timing adjustment granularity that is associated with one of the multiple numerologies.

An apparatus, in certain embodiments, may include means for receiving an indication from a network node. A timing adjustment granularity may be determined implicitly based on the indication and one or more multiple numerology assigned to a timing advance group. The apparatus may also include means for applying the indicated timing adjustment granularity associated with one of the multiple numerologies.

According to certain embodiments, a non-transitory computer-readable medium encoding instructions that, when executed in hardware, perform a process. The process may include receiving at a user equipment an indication from a network node. A timing adjustment granularity may be determined implicitly based on the indication and one or more multiple numerology assigned to a timing advance group. The process may also include applying at the user equipment the indicated timing adjustment granularity associated with one of the multiple numerologies.

According to certain other embodiments, a computer program product may encode instructions for performing a process. The process may include receiving at a user equipment an indication from a network node. A timing adjustment granularity may be determined implicitly based on the indication and one or more multiple numerology assigned to a timing advance group. The process may also include applying at the user equipment the indicated timing adjustment granularity associated with one of the multiple numerologies.

An apparatus, according to certain embodiments, may include circuitry for receiving an indication from a network node. A timing adjustment granularity may be determined implicitly based on the indication and one or more multiple numerology assigned to a timing advance group. The apparatus may also include circuitry for applying the indicated timing adjustment granularity associated with one of the multiple numerologies.

According to certain embodiments, an apparatus may include at least one memory including computer program code, and at least one processor. The at least one memory and the computer program code may be configured, with the at least one processor, to cause the apparatus at least to transmit an indication to a user equipment. The indication may include a timing adjustment granularity associated with one of multiple numerologies. The at least one memory and the computer program code may also be configured, with the at least one processor, to cause the apparatus at least to receive an uplink transmission from the user equipment based on the indicated timing adjustment granularity.

According to certain embodiments, a method may include transmitting an indication from a network node to a user equipment. The indication may include a timing adjustment granularity associated with one of multiple numerologies. The method may also include receiving an uplink transmission at the network node from the user equipment based on the indicated timing adjustment granularity.

In another variant, the timing adjustment granularity may be in relation to timing adjustment command.

In a variant, the multiple numerologies may be included within a same timing advance group.

In another variant, the indication may be a timing advance command.

In yet another variant, the indication may include at least one of logical channel identification representing the timing adjustment granularity, a length of a timing advance command medium access control element, or a bit indicator in the MAC subheader.

In an additional variant, the method may include transmitting the indication from the network node to a user equipment as part of a radio resource control signaling.

In a variant, the timing adjustment granularity may be semi-statically configured via the radio resource control signaling.

In a further variant, the timing adjustment granularity may be dynamically configured via the timing advance command medium access control control element.

In another variant, the timing adjustment granularities of at least two of the multiple granularities may be configured using the radio resource control signaling.

An apparatus, in certain embodiments, may include means for transmitting an indication to a user equipment. The indication may include a timing adjustment granularity associated with one of multiple numerologies. The apparatus may also include means for receiving an uplink transmission from the user equipment based on the indicated timing adjustment granularity.

According to certain embodiments, a non-transitory computer-readable medium encoding instructions that, when executed in hardware, perform a process. The process may include transmitting an indication from a network node to a user equipment. The indication may include a timing adjustment granularity associated with one of multiple numerologies. The process may also include receiving an uplink transmission at the network node from the user equipment based on the indicated timing adjustment granularity.

According to certain other embodiments, a computer program product may encode instructions for performing a process. The process may include transmitting an indication from a network node to a user equipment. The indication may include a timing adjustment granularity associated with one of multiple numerologies. The process may also include receiving an uplink transmission at the network node from the user equipment based on the indicated timing adjustment granularity.

An apparatus, according to certain embodiments, may include circuitry for transmitting an indication to a user equipment. The indication may include a timing adjustment granularity associated with one of multiple numerologies. The apparatus may also include circuitry for scheduling an asynchronous HARQ retransmission during a timing of the virtual process number. In addition, the apparatus may include circuitry for receiving an uplink transmission from the user equipment based on the indicated timing adjustment granularity.

BRIEF DESCRIPTION OF THE DRAWINGS

For proper understanding of an example of the invention, reference should be made to the accompanying drawings, wherein:

FIG. 1 illustrates an example of a table according to certain embodiments.

DETAILED DESCRIPTION

Figures 2, 3:
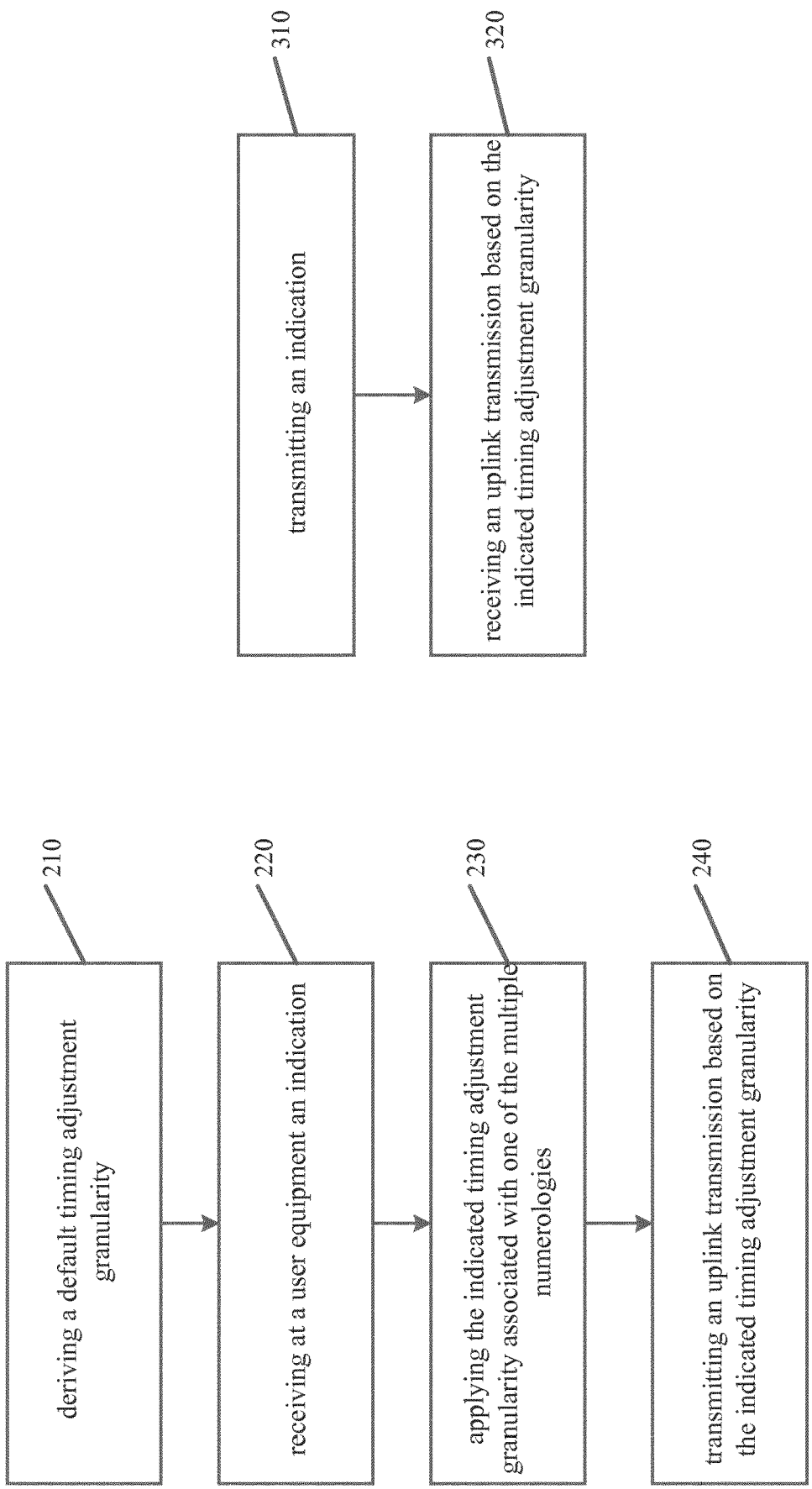
FIG. 2 illustrates an example of a method flow diagram according to certain embodiments.
FIG. 3 illustrates an example of a method flow diagram according to certain embodiments.

Having a common timing adjustment command granularity of 4.7 μs may be sufficient when the subcarrier spacing (SCS) is equal to 15 kHz. Such timing adjustment granularity may be too coarse for higher SCS options, which may support a significantly shorter normal CP. Because the CP length may scale inversely proportional to the SCS, a higher SCS may lead to a shorter CP. For example, SCS of 60 kHz may have a 1.2 μs CP while an SCS of 120 kHz may have a 0.6 μs CP. This leaves a reduced time margin for multipath propagation in NR technology, and creates new requirements for timing adjustment.

Given that the NR timing adjustment granularity for an SCS equal to 15 kHz is 0.52 μs or 1024 time samples, similar to LTE, such a timing adjustment may not work for higher numerologies. Finer timing adjustment granularities may be defined for higher SCS options, as a timing adjustment granularity of 0.52 may not be sufficient for wider SCS values. When multiple BWPs with different numerologies are assigned to the same TAG, it may be difficult to adjust the uplink timing adjustment for the user equipment. Alternatively, the user equipment may be configured with multiple carriers having different numerologies. In embodiments in which the carriers can share the same timing reference point, however, it may not be attractive to group them into different TAGs just because of the different numerologies—this may require Timing Advance Commands to be transmitted to each TAG separately even though the timing reference may be the same. In addition, in NR TAGs may be limited to a maximum of 4.

In order to allow the user equipment to properly deal with multiple numerologies assigned to the same TAG, in certain embodiment the network node may indicate to the user equipment the timing adjustment granularity needed to be applied. The network node, for example, may be a 5G or a NR NodeB (gNB). The indicated timing adjustment granularity may be associated with one of multiple numerologies. An example of a numerology may be subcarrier spacing. The association between multiple numerologies and corresponding multiple timing adjustment granularities is shown in FIG. 1. The SCS and the timing adjustment command granularity shown in FIG. 1 may correspond to values defined for NR Phase 1. It may be possible to define further values by extending the table towards a smaller SCS, for example 7.5 kHz, and/or towards a larger SCS, for example 480 kHz.

Once the user equipment receives the indication including the one or more timing adjustment command granularities, as well as timing adjustment command, the user equipment may transmit an uplink data transmission to the network node using the indicated timing adjustment granularity. For example, the user equipment may adjust the uplink data transmission timing according to the timing adjustment command given with the indicated timing adjustment granularity. This indication of the timing adjustment granularity value from the network node may allow the user equipment to apply the appropriate or correct timing adjustment when multiple numerologies are available to the user equipment. Such embodiments may allow NR technology to efficiently support multiple numerologies within the same TAG.

The timing adjustment granularity value, in some embodiments, may be determined implicitly by the user equipment based on the numerology assigned to or associated with the timing advance group. For example, timing adjustment command may include a TAG index, and based on the TAG index the user equipment may implicitly know to select the timing adjustment granularity requiring the finest granularity. As discussed above, the finest timing adjustment granularity, meaning the smallest timing adjustment, may be associated with the biggest or largest SCS.

In other embodiments, the timing adjustment granularity value may be explicitly indicated to the user equipment by the network node in the indication. The indication, for example, may take the form of a timing advance command (TAC) or a TAC medium access control control element (MAC CE). To indicate the timing adjustment granularity, the indication may use a different logical channel identification (LCID) per required granularity for the TAC MAC CE. In other words, a user equipment receiving an LCID may know which timing adjustment granularity value is associated with the received LCID. In certain embodiments, a first LCID may be associated with the default timing adjustment granularity, while a second LCID may be associated with the timing adjustment granularity of the largest configured SCS.

In some other embodiments, the timing adjustment granularity may be indicated by the length of the TAC MAC CE received by the user equipment. The user equipment may know that a given length of a TAC MAC CE is associated with a certain timing adjustment granularity value. For example, a finer or smaller timing adjustment granularity may have a longer length of the TAC MAC CE, since it may include more indexes. In certain embodiments, the indication may be included in a field in the TAC MAC CE. The timing adjustment granularity may also be indicated by one or more bit indices in the MAC CE subheader. The indicator may be included in one or more of the unused R bits included in the MAC subheader. More details regarding the unused R bit are explained in 3GPP TS 36.321. 3GPP TS 36.321 is hereby incorporated by reference in its entirety. In some embodiments, the timing adjustment granularity may be indicated explicitly by a field inside the TAC MAC CE.

The indication received at the user equipment from the network node, in certain embodiments, may be included as part of a radio resource control (RRC) signal. Therefore, the RRC signaling may be used to configure the timing adjustment granularity value for a TAG. The configuration of RRC signaling may be semi-static, rather than being indicated dynamically in every TAC MAC CE. In some embodiments including RRC signaling, it may take up to ten or tens of milliseconds to transmit the signaling. On the other hand, layer 1 (L1) signaling, such as signaling included in downlink control information, and MAC signaling may be more dynamic. L1 or MAC signaling may also have a predefined timing relationship, and the user equipment or network node, for example a gNB, may have the same understanding when a new configuration is taken into use. This may not be the case with RRC signaling that is semi-static.

In some other embodiments, a combination of any of the above may be used to indicate the timing adjustment granularity to the user equipment having multiple numerologies. For example, the timing adjustment granularities of at least two of the multiple granularities may be semi-statically configured using the RRC signaling while the indication of which one to use can be signaled dynamically via MAC when TAC MAC CE is indicated. The RRC signaling may include one or more signals.

In certain embodiments, a default granularity may be configured for a timing advance group, for a user equipment, or for a MAC. When a default granularity exists, a user equipment may have yet to receive an explicit indication from the network node of the timing adjustment granularity. For example, the default granularity may be similar to the timing adjustment granularity of the LTE having a length of 0.52 μs. Once a user equipment receives a TAC MAC CE without a timing adjustment granularity indication, it may use the configured default granularity. Once a user equipment receives an indication of the timing adjustment granularity from the network node, the user equipment may change the default timing adjustment granularity based on the received timing adjustment granularity. When the received timing adjustment granularity is enforced by the MAC CE, a different LCID may be used and a bitmap or length field in front of the TAC may be used to indicate the granularity.

FIG. 1 may illustrate an example of a table according to certain embodiments. In particular, FIG. 1 illustrates an example of a table of preferred timing adjustment granularities 120 for different numerologies 110. A numerology, for example, may be a SCS or any other characteristic of a subframe. The multiple numerologies shown in FIG. 1 are an SCS of 15 kHz, 30 kHz, 60 kHz, 120 kHz, and 240 kHz. Each of the multiple numerologies may be associated with a timing adjustment granularity. The timing adjustment granularity may include a number of $T_s$ and an associated time listed in ns. A SCS of 15 kHz may be associated with 1024 $T_s$ and 520.8 nanoseconds (ns), while a SCS of 30 kHz may be associated with 512 $T_s$ and 260.4 ns. A SCS of 60 kHz may be associated with 256 $T_s$ and 130.2 ns, while an SCS of 120 kHz may be associated with 128 $T_s$ and 65.1 ns, and an SCS of 240 kHz may be associated with 64 $T_s$ and 32.6 ns. The indication may include any of the timing adjustment granularity shown in Table 1.

In certain embodiments, the user equipment may maintain a single timing reference per TAG that is based on the same timing reference and the timing advance command for all numerologies within the TAG. There may be no harm in using a finer timing adjustment than is necessary for the narrower SCS options. In other words, using a timing adjustment of 64 $T_s$ for an SCS of 120 kHz, as opposed to a timing adjustment of 128 $T_s$ may be acceptable.

As described above, certain embodiments may explicitly indicate the timing adjustment granularity. The indication may be a timing advance command or included in a TAC MAC CE. In certain embodiments, the user equipment may derive an initial timing adjustment granularity based on a default timing adjustment granularity. The default timing adjustment granularity, for example, may be determined based on a table similar to Table 1, and may be based on the numerology used in a received synchronization signal block. For example, a user equipment may be configured with only a 15 kHz SCS or numerology, which means that a 0.52 μs or a 520.8 ns timing adjustment granularity may be used. In some other embodiments, the user equipment may determine that the synchronization signal block has a SCS of 15 kHz and use a 0.52 microseconds (μs) or a 520.8 ns timing adjustment granularity as a default. In other embodiments, a different SCS may be used.

When the user equipment is configured with multiple numerologies, such as an additional numerology of 60 kHz, a finer timing adjustment corresponding to the finer numerology may be used. In certain embodiments, usage of multiple numerologies and/or multiple component carriers may be configured using RRC signaling. When timing adjustment granularity is determined based on the assigned or associated numerologies and/or the RRC signaling, there may be a time interval in which the network node, for example a gNB, may be uncertain about the timing adjustment granularity that the user equipment will apply when interpreting the TAC MAC CE. In other words, the timing adjustment granularity may be in relation to a timing adjustment command. As discussed above, such a time interval may lead to significant timing errors when the gNB signals the timing advance command using a finer timing adjustment, and the user equipment interprets that timing advance command using 0.52 μs timing adjustment granularity. This uncertainty may be avoided by explicitly indicating the timing adjustment granularity in the TAC MAC CE to the user equipment.

In certain embodiments, the transmission of the uplink frame from the user equipment to the network node may start at $T_{TA}=N_{TA}T_S$ before the start of the corresponding downlink frame at the user equipment, where $T_s=1/(\Delta f_{max} \cdot N_f)$, $\Delta f_{max}=480 \cdot 10^3$ Hz and $N_f=4096$. $N_{TA}$ may be the previous timing advance value, which may be determined, for example, during a random access procedure. Initial timing advance command may be the first timing advance command signaled to the user equipment during a random access process in random access response. The command may adjust the previous timing advance value, whereas the initial timing advance command may be the timing advance value. A timing advance command may indicate an adjustment of the current NTA value from an old NTA value to the new NTA value using index values of TA=0, 1, 2, . . . , M, where M is the maximum TA index value.

The new NTA may equal the old $$NTA + \left(TA - \left[\frac{M}{2}\right]\right) \cdot 32 \cdot \frac{\Delta f\max}{\Delta f},$$

where Δf corresponds to the SCS associated with the timing adjustment granularity indicated on the TAC MAC CE. For example, $\Delta f=60 \cdot 10^3$ for finer timing adjustment granularity, and $\Delta f=15 \cdot 10^3$ for a coarser timing granularity. The timing adjustment command granularity may be the ratio of $$32 \cdot \frac{\Delta f\max}{\Delta f}.$$

The finer and coarser the timing adjustment granularity for TAC MAC CE may be predefined in the specification, in some embodiments, and may be specific for frequency bands. More than two frequency bands may be divided in a predetermined way, for example below or above 6 gigahertz (GHz).

FIG. 2 illustrates an example of a method flow diagram according to certain embodiments. In particular, FIG. 2 illustrates a method performed by a user equipment. In step 210, the user equipment may derive a default timing adjustment granularity based on one of the multiple numerologies used in a received synchronization signal block. The user equipment may use, for example, the table illustrated in Table 1 to derive the timing adjustment granularity. The user equipment may also include applying the default timing adjustment granularity before receiving an indication from the network node. In step 220, the user equipment may receive an indication from the network node, such as a gNB. In certain embodiments, the timing adjustment granularity may be determined implicitly based on one of the multiple numerologies assigned to a TAG. In other words, the timing adjustment granularity is determined implicitly based on one or more multiple numerology assigned to the TAG. The indication may include a timing adjustment granularity associated with one of multiple numerologies. The multiple numerologies may be part of the same TAG. The indication may be a timing advance command or a TAC MAC CE. The timing adjustment granularity may be in relation to a timing adjustment command.

In step 230, the user equipment may apply the indicated timing adjustment granularity associated with one of the multiple numerologies. The timing adjustment granularity may be defined in relation to timing adjustment command, whereas the granularity in actual user equipment transmission time adjustment is left in standards bit open for implementation. For example, it may be enough that the UL transmitter timing be within certain boundaries around the signaled timing advance value. In some embodiments, the user equipment may interpret or receive the timing adjustment command based on the received indication. In step 240, the user equipment may then transmit an uplink transmission to the network node based on the indicated timing adjustment granularity. In some other embodiments, the indication may be explicit. The indication may include at least one of LCID representing the timing adjustment granularity, a length of a TAC MAC CE, a field of the TAC MAC CE, or a bit indicator in the MAC subheader.

In certain embodiments, the indication may be included as part of a RRC signalling. The timing adjustment granularity may be semi-statically configured via that radio resource control signaling and not indicated dynamically along with the timing advance command at MAC. For example, the timing adjustment granularities of at least two of the multiple granularities may be semi-statically configured using the RRC signaling and these at least two may be dynamically indicated using the MAC signaling.

In some other embodiments, the user equipment may receive at least one other timing adjustment granularity that is associated with one of the multiple numerologies. In other words, the UE may receive multiple timing adjustment granularities for the multiple numerologies in one same timing advance group. Depending on the numerology, such as a SCS, the step-size of the timing advance command may be changed. In other embodiments, the user equipment may be configured with the granularity applied generally for all the TAGs. For example, based on the highest SCS, the finest granularity may be configured and enforced by the TAC MAC CE. Alternatively, the granularity may be implicitly known to the user equipment based on the highest SCS used currently, supported by the user equipment or the network, or supported by the release of specification.

FIG. 3 illustrates an example of a method flow diagram according to certain embodiments. In particular, FIG. 3 may be a network node, such as a gNB, which may be used in a network along with the user equipment described in FIG. 2. In step 310, the network node may transmit an indication to a user equipment. The indication may include a timing adjustment granularity associated with one of multiple numerologies. The multiple numerologies may be included with a same timing advance group. In addition, in certain embodiments the indication may be transmitted by the network node as part of an RRC signaling. In step 320, the network node may receive an uplink transmission from the user equipment based on the indicated timing adjustment granularity. In certain embodiments, the network node may transmit the indication to the user equipment as part of a RRC signaling. The timing adjustment granularity may be in relation to timing adjustment command.

Figure 4:
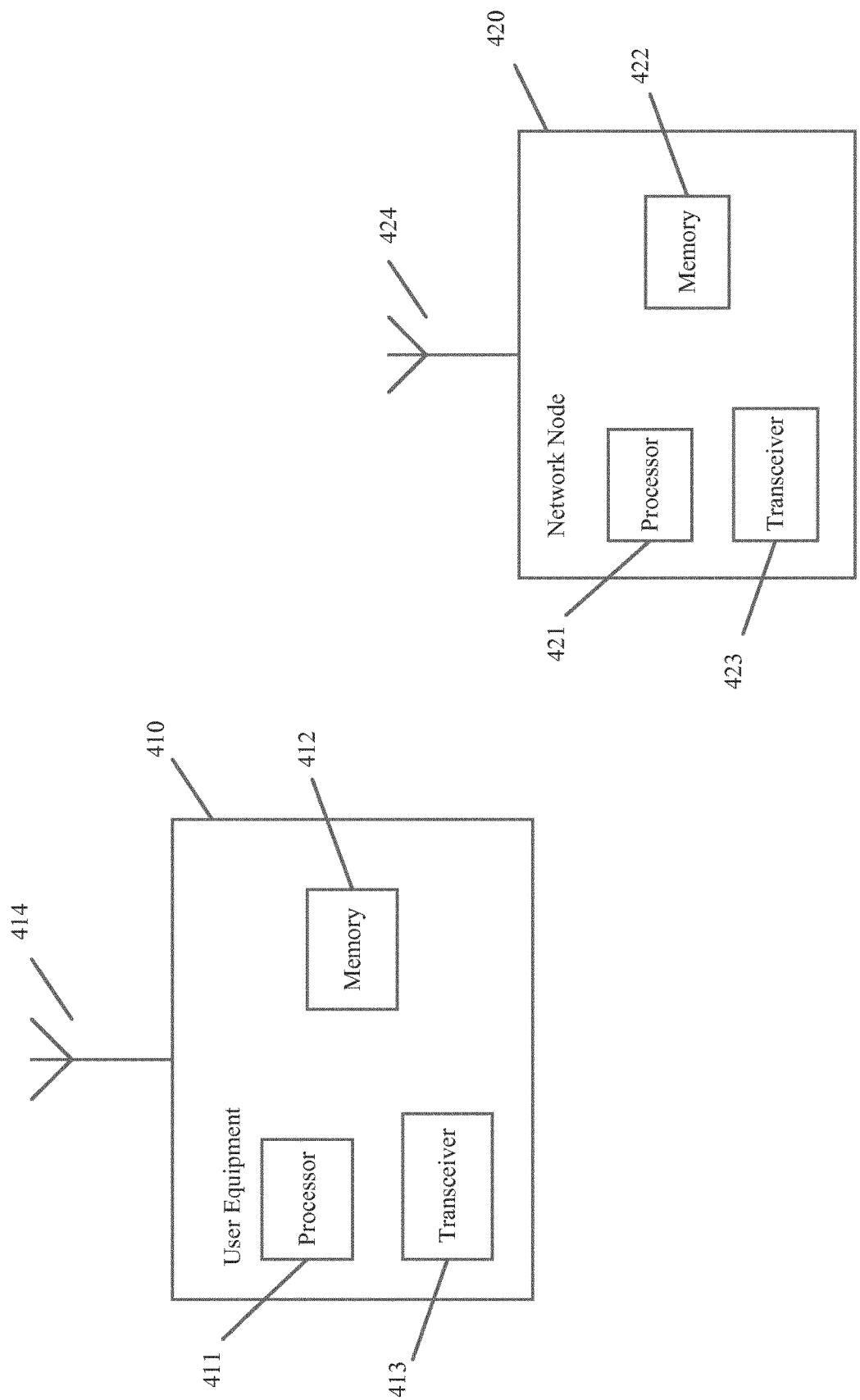
FIG. 4 illustrates an example of a system diagram according to certain embodiments.

FIG. 4 illustrates a system according to certain embodiments. It should be understood that each signal or block in FIGS. 1-3 may be implemented by various means or their combinations, such as hardware, software, firmware, one or more processors and/or circuitry. In one embodiment, a system may include several devices, such as, for example, network node 420 or user equipment (UE) 410. The system may include more than one UE 410 and more than one network node 420. Network node 420 may be a base station, an access point, an access node, a gNB, a 5G NB, a server, a host, or any other network entity or core network entity that may communicate with the UE.

Each of these devices may include at least one processor or control unit or module, respectively indicated as 411 and 421. At least one memory may be provided in each device, and indicated as 412 and 422, respectively. The memory may include computer program instructions or computer code contained therein. One or more transceiver 413 and 423 may be provided, and each device may also include an antenna, respectively illustrated as 414 and 424. Although only one antenna each is shown, many antennas and multiple antenna elements may be provided to each of the devices. Other configurations of these devices, for example, may be provided. For example, network node 420 and UE 410 may be additionally configured for wired communication, in addition to wireless communication, and in such a case antennas 414 and 424 may illustrate any form of communication hardware, without being limited to merely an antenna.

Transceivers 413 and 423 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or a UE 410, may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a user equipment or a network node, may include means for carrying out embodiments described above in relation to FIGS. 1-3. In certain embodiments, at least one memory including computer program code can be configured to, with the at least one processor, cause the apparatus at least to perform any of the processes described herein.

Processors 411 and 421 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 420 or UE 410, to perform any of the processes described above (see, for example, FIGS. 1-3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

In certain embodiments, an apparatus may include circuitry configured to perform any of the processes or functions illustrated in FIGS. 1-4. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The above embodiments may provide for significant improvements to the functioning of a network and/or to the functioning of the network entities within the network, or the user equipment communicating with the network. For example, the above embodiments may allow the user equipment to efficiently function while supporting multiple numerologies within the same TAG group. Certain embodiments may also maintain sufficient timing adjustment resolution when operating with small subcarrier spacing, which may allow the embodiments to reach the necessary timing adjustment accuracy. The embodiments may also be robust against signaling error, in which uncertainty related to RRC signaling may be avoided by explicitly indicating the timing adjustment granularity in the TAC MAC CE.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 3GPP NR and 5G technology, the above embodiments may also apply to any other present or future 3GPP technology, such as IoT technology, Long Term Evolution (LTE), LTE-advanced, and/or fourth generation (4G) technology.

PARTIAL GLOSSARY

BWP Bandwidth Part
CE Control Element
LCID Logical Channel ID
SCS Subcarrier Spacing
TA Timing Adjustment or Timing Advance
TAC Timing Advance Command
TAG Timing Advance Group

The invention claimed is:

1. A method, comprising:
receiving at a user equipment, from a network node, a timing advance command associated with a timing advance group;
determining, based on the timing advance command and a timing adjustment granularity, a timing adjustment for a plurality of bandwidth parts associated with the timing advance group,
wherein the plurality of bandwidth parts are configured with a plurality of subcarrier spacings, the plurality of subcarrier spacings comprising at least two different subcarrier spacings;
wherein the timing adjustment granularity is determined based on a largest subcarrier spacing of all of the plurality of subcarrier spacings; and
applying, at the user equipment, the determined timing adjustment to the plurality of bandwidth parts associated with the timing advance group.

2. A computer program embodied on a non-transitory computer-readable medium, said computer program comprising instructions that, when executed in hardware, perform the method of claim 1.

3. A method, comprising:
transmitting, from a network node to a user equipment, a timing advance command associated with a timing advance group;

wherein a timing adjustment for a plurality of bandwidth parts associated with the timing advance group is determined based on the timing advance command and a timing adjustment granularity, wherein the plurality of bandwidth parts are configured with a plurality of subcarrier spacings, the plurality of subcarrier spacings comprising at least two different subcarrier spacings, wherein the timing adjustment granularity is determined based on a largest subcarrier spacing of all of the plurality of subcarrier spacings; and receiving an uplink transmission at the network node from the user equipment based on the timing adjustment.

4. The method according to claim 3, wherein the timing adjustment granularity is associated with at least one of multiple numerologies associated with the timing advance group.

5. The method according to claim 4, wherein the multiple numerologies are included within a same timing advance group.

6. The method according to claim 3, wherein the timing adjustment granularity is indicated by at least one of a logical channel identification representing the timing adjustment granularity, a length of a timing advance command (TAC) medium access control (MAC) control element (CE), and a bit indicator in the medium access control subheader.

7. The method according to claim 3, wherein the timing adjustment granularity is dynamically configured via a timing advance command (TAC) medium access control (MAC) control element (CE).

8. A computer program embodied on a non-transitory computer-readable medium, said computer program comprising instructions that, when executed in hardware, perform the method of claim 3.

9. An apparatus, comprising:
at least one processor; and
at least one memory and computer program code, wherein the at least one memory and the computer program code are configured to, with the at least one processor, cause the apparatus at least to:
  receive, from a network node, a timing advance command associated with a timing advance group;
  determine, based on the timing advance command and a timing adjustment granularity, a timing adjustment for a plurality of bandwidth parts associated with the timing advance group,
  wherein the plurality of bandwidth parts are configured with a plurality of subcarrier spacings, the plurality of subcarrier spacings comprising at least two different subcarrier spacings,
  wherein the timing adjustment granularity is determined based on a largest subcarrier spacing of all of the plurality of subcarrier spacings; and
  apply the determined timing adjustment to the plurality of bandwidth parts associated with the timing advance group.

10. The apparatus according to claim 9, wherein the at least one memory and the computer program code are configured to, with the at least one processor, cause the apparatus at least to:
  transmit, from the apparatus to the network node, an uplink transmission on at least one of said bandwidth parts based on the timing adjustment granularity.

11. The apparatus according to claim 9, wherein the timing adjustment granularity is determined by the apparatus based on at least one numerology associated with the timing advance group.

12. The apparatus according to claim 9, wherein the timing adjustment granularity is associated with at least one of multiple numerologies associated with the timing advance group.

13. The apparatus according to claim 12, wherein the at least one memory and the computer program code are configured to, with the at least one processor, cause the apparatus at least to:
  derive a default timing adjustment granularity based on one of the multiple numerologies used in a received synchronization signal block; and
  apply the default timing adjustment granularity before receiving the timing advance command.

14. The apparatus according to claim 12, wherein the apparatus is configured to receive at least one other timing adjustment granularity that is associated with one of the multiple numerologies.

15. The apparatus according to claim 9, wherein the timing advance command indicates which granularity to apply by the timing advance command.

16. The apparatus according to claim 9, wherein the timing adjustment granularity is indicated by at least one of a logical channel identification representing the timing adjustment granularity, a length of a timing advance command (TAC) medium access control (MAC) control element (CE), a field in the TAC MAC CE, or a bit indicator in the medium access control subheader.

17. The apparatus according to claim 9, wherein the timing advance command is included as part of radio resource control signaling.

18. The apparatus according to claim 9, wherein the timing adjustment granularity is dynamically configured via a timing advance command (TAC) medium access control (MAC) control element (CE).

19. The apparatus according to claim 9, wherein the timing advance command comprises a timing advance group index.

20. An apparatus, comprising:
at least one processor; and
at least one memory and computer program code, wherein the at least one memory and the computer program code are configured to, with the at least one processor, cause the apparatus at least to:
  transmit, to a user equipment, a timing advance command associated with a timing advance group;
  wherein a timing adjustment for a plurality of bandwidth parts associated with the timing advance group is determined based on the timing advance command and a timing adjustment granularity,
  wherein the plurality of bandwidth parts are configured with a plurality of subcarrier spacings, the plurality of subcarrier spacings comprising at least two different subcarrier spacings,
  wherein the timing adjustment granularity is determined based on a largest subcarrier spacing of all of the plurality of subcarrier spacings; and
  receive an uplink transmission from the user equipment based on the timing adjustment.

* * * * *